W. S. POTWIN.
Teakettle-Handle.

No. 162,305. Patented April 20, 1875.

WITNESSES.

INVENTOR.
William S. Potwin
By Gridley & Warner
his attys

THE GRAPHIC CO. PHOTO-LITH. 39 & 41 PARK PLACE, N.Y.

UNITED STATES PATENT OFFICE.

WILLIAM S. POTWIN, OF CHICAGO, ILLINOIS.

IMPROVEMENT IN TEA-KETTLE HANDLES.

Specification forming part of Letters Patent No. 162,305, dated April 20, 1875; application filed March 9, 1875.

*To all whom it may concern:*

Be it known that I, WILLIAM S. POTWIN, of Chicago, in the county of Cook and State of Illinois, have invented a new, useful, and improved article of manufacture, consisting of a Tea-Kettle Handle, of which the following is a full, clear, and exact description, which will enable others skilled in the art to which my invention appertains to make and apply the same to use, reference being had to the accompanying drawing forming a part hereof, and in which—

Figure 1:
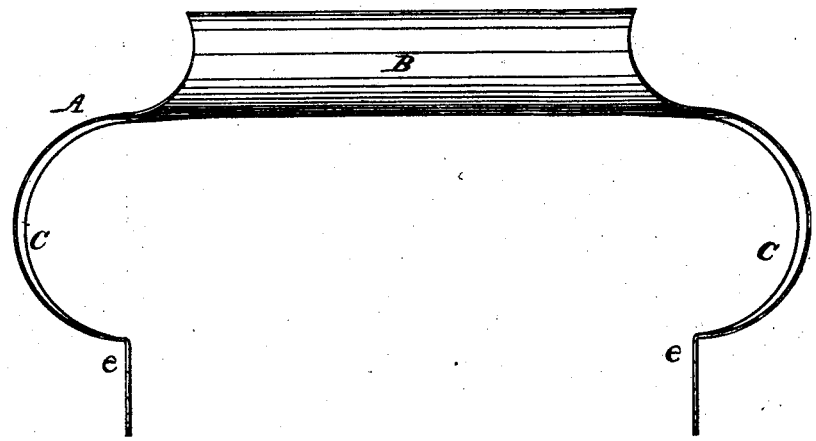
Figure 2:
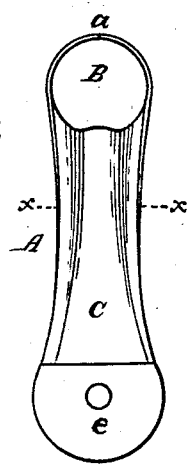

Figure 1 is a side elevation of my improved handle; Fig. 2, an end elevation thereof, and Fig. 3 a section in the plane of the line $x\ x$.

Like letters of reference indicate like parts.

The object of my invention is to make a cheap, light, and strong handle for tea-kettles, and one that will not be liable to become highly heated, and which may be used with facility for the purpose for which it is intended.

Figure 3:

In the drawing, A represents the handle when finished and ready to be applied to the kettle. This handle is made, preferably, of a blank of heavy sheet metal, but may be cast. When made of sheet metal the central part of the blank is made wide, so that it may be rolled or turned up in the form of a hollow cylinder open at both ends, and of such a size as to be conveniently and firmly grasped. This part of the handle is represented at B. The edges of the parts thus brought together, as at $a$, are soldered to each other, preferably by the process of tinning; but they may be fastened to each other in any known manner. The remaining parts of the blank are narrow, and are curved, as shown at C C, and the ends of these curved parts are bent back, as represented at $e\ e$, by means of which projections the handle may be attached to the breast of the kettle in the usual manner. The parts C C are corrugated, as shown in Fig. 3, for the purpose of making them stiffer and stronger than they would otherwise be.

The whole handle is thus made of one piece and adapted for attachment to the kettle. It is cheap, and, though made of heavy metal, is comparatively light, that part being narrow which is not intended to be grasped. The form of the handle is also such as to render it stiff and strong. The central part is sufficiently large to be conveniently and firmly grasped, so that the kettle may be easily controlled for the purpose of pouring out its contents. The parts C C, by being small, prevent a considerable degree of heat being communicated to the part B, and the latter, by being hollow and open at both ends, allows the air to pass freely through it, thus preventing it from becoming unduly heated.

I am aware that the central part of the handle has heretofore been made hollow or tubular, and sufficiently large to be grasped with ease; but so far as I am aware I am the first to make a handle of this class in one piece, and to leave the ends of the tubular part open. I do not, therefore, claim a tubular handle, broadly; but

Having thus described my invention, what I claim as new, and desire to secure by Letters Patent, is—

As a new article of manufacture, a tea-kettle handle consisting of the large hollow part B, open at both ends, and of the slender corrugated parts C C, provided with the parts $e\ e$, all made in one continuous piece, substantially as specified.

WILLIAM S. POTWIN.

Witnesses:
N. C. GRIDLEY,
F. F. WARNER.